Feb. 1, 1938.   F. W. NANKIVELL   2,107,208
VEGETABLE CUTTER
Filed April 3, 1936
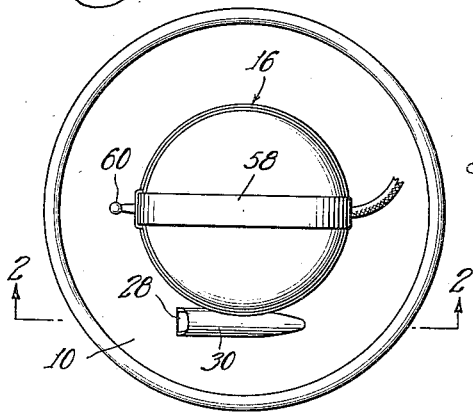
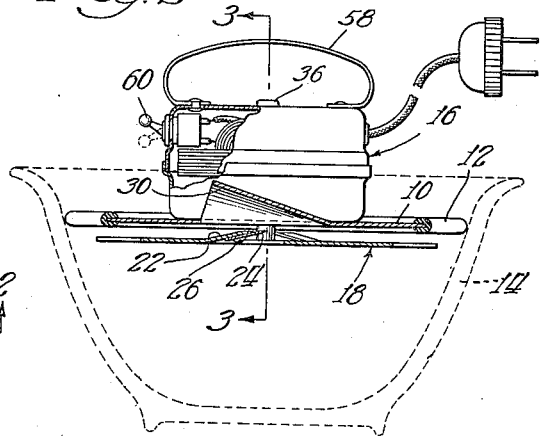
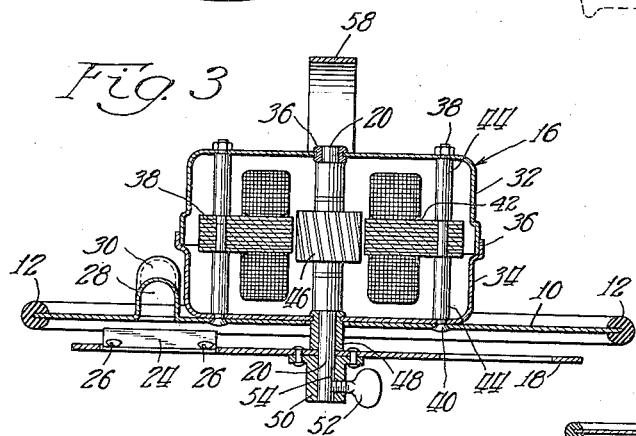
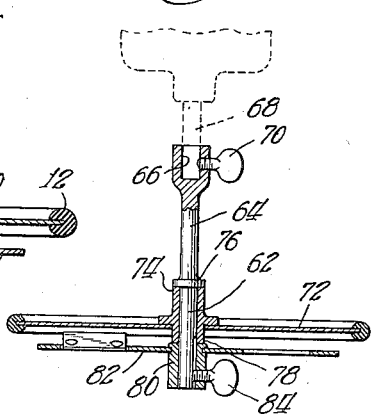
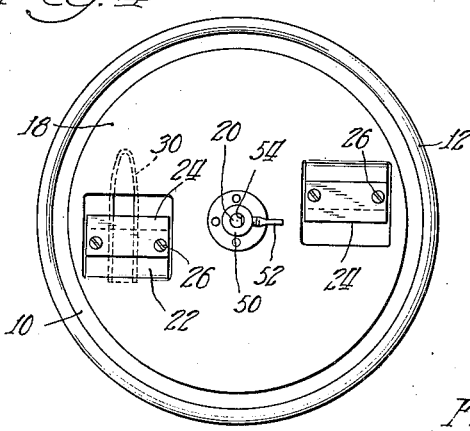
Frederick W. Nankivell.
INVENTOR
BY Victor J. Evans & Co.
ATTORNEYS.

Patented Feb. 1, 1938

2,107,208

UNITED STATES PATENT OFFICE 2,107,208

VEGETABLE CUTTER

Frederick W. Nankivell, Chicago, Ill.

Application April 3, 1936, Serial No. 72,618

1 Claim. (Cl. 146—124)

My invention relates to the reduction of vegetables, and has among its objects and advantages the provision of an improved string bean slicer.

In the accompanying drawing:

Fig. 1 is a top plan view of the invention;

Fig. 2 is a side elevation partly in section showing the device associated with a receptacle for receiving the sliced beans;

Fig. 3 is a sectional view along the line 3—3 of Fig. 2;

Fig. 4 is a bottom plan view; and

Fig. 5 is a view illustrating an extension shaft applied to the cutter for connection with an independent source of power.

In the embodiment selected to illustrate my invention, I make use of a metal plate 10 having its circumferential edge enclosed within a resilient bead 12, which bead is arranged to rest upon the wall of a receptacle 14 for receiving the sliced beans. An electric motor 16 is mounted upon the plate 10 and is connected with a rotary cutter 18 through the medium of a shaft 20. The cutter 18 comprises a metallic plate cut through at diametrically opposed areas and the material bent out of its normal plane to provide lips 22 to which cutting blades 24 are connected by screws 26.

I provide the plate 10 with an inlet opening 28 for the string beans to be cut. The plate is deformed to provide a raised guide 30 for the string beans, which guide is angularly arranged with respect to the plate to deliver the string beans in angular relation with the cutter 18.

The blades 24 terminate in close relation with the plate 10 and sever the string beans diagonally. The motor 16 rotates the cutter 18 rapidly, and the blades 24 tend to pull the bean inwardly during the cutting action so that the bean will be properly positioned for the succeeding blade. When once the bean has been pushed into cutting relation with the cutter 18 through the opening 28, the operation is entirely automatic. The plate 10 is so designed as to adapt the cutter to various types of receptacles. When associated with a receptacle according to Fig. 2, the cutter is effectively connected with the receptacle and is easily balanced.

Referring to Fig. 3, the motor 16 includes a housing made up of sections 32 and 34 which have interfitting relation at 36. These sections are firmly secured together by bolts 38, each having one end riveted at 40 to the plate 10. Thus, the bolts 38 tie the sections 32 and 34 together and connect the motor with the plate 10.

The field 42 is mounted upon the bolts 38 and is maintained in fixed relation therewith because of sleeves 44 mounted upon the bolts. The armature 46 is connected with the shaft 20 extending through a bearing 48 fixedly connected with the section 34. This bearing extends through an opening in the plate 10, and constitutes an abutment for the cutter 18. I connect a boss 50 with the cutter 18, which boss is fixedly connected with the shaft 20 by means of a set screw 52 having its end bearing against the flattened side 54 of the shaft. The opposite end of the shaft 20 is supported by a bearing 56 carried by the section 32.

A handle 58 may be connected with the motor 16 which handle is arranged in operative relation with a switch 60 for controlling the circuit for the motor.

In Fig. 5, I illustrate a slightly different construction, one in which the shaft 62 is extended at 64 and provided with a socket 66 for the reception of the motor shaft 68. In this way, the shaft 62 may be connected with an independent source of power.

A set screw 70 may be associated with the socket 66 for connecting the socket with the shaft 68. The plate 72 which corresponds to the plate 10 includes a fixedly connected boss 74 constituting a bearing for the shaft 62. This shaft is provided with a collar 76 which bears against one end of the boss 74, which boss is extended at 78 to constitute an abutment for the boss 80 carried by the cutter 82. When the cutter 82 is connected with the shaft 62 and the set screw 84 tightened, all the parts are effectively connected together.

The lips 22 lie within the contour of the plate 18 so that its peripheral margin is unbroken, thereby lending strength to the plate.

Without further elaboration, the foregoing will so fully explain my invention that others may, by applying current knowledge, readily adapt the same for use under various conditions of service.

I claim:

A string bean cutter comprising a plate in the nature of a removable cover for a receptacle, said plate being provided with a load carrying bead of resilient material arranged for engaging the wall of the receptacle for supporting the plate, a rotatable cutter carried by said plate in slightly spaced relation with its bottom side, means for rotating the cutter, and means carried by said plate for guiding beans into cutting relation with said cutter, said means being accessible from the side of the plate opposite the rotatable cutter.

FREDERICK W. NANKIVELL.